United States Patent [19]
Kobari et al.

[11] Patent Number: 5,626,682
[45] Date of Patent: May 6, 1997

[54] PROCESS AND APPARATUS FOR TREATING INNER SURFACE TREATMENT OF CHAMBER AND VACUUM CHAMBER

[75] Inventors: Toshiaki Kobari; Nobuo Hirano; Manabu Matsumoto, all of Ibaraki-ken; Mamoru Katane, Hitachi; Hiroaki Sakurabata, Hitachi; Shiro Matsuzaki, Hitachi, all of Japan

[73] Assignee: Hitachi, Ltd., Japan

[21] Appl. No.: 405,768

[22] Filed: Mar. 17, 1995

[30] Foreign Application Priority Data

Mar. 17, 1994 [JP] Japan .................................. 6-047061

[51] Int. Cl.⁶ ...................................................... B08B 9/00
[52] U.S. Cl. ...................... 134/8; 134/22.11; 15/104.05; 15/104.16
[58] Field of Search ............................ 134/8, 22.1, 22.11, 134/22.12, 23, 21; 15/104.05, 104.16

[56] References Cited

PUBLICATIONS

Studies of Photo Induced Gas Desorption Using Synchrotron Radiation; O. Groebner, A. G. Mathewson, H. Stoeri, P. Strubin and R. Souchet; Vacuum, vol. 7, No. 7, pp. 397 to 406, 1983, Pergamon Press Ltd.

Synchrotron Radiation Induced Neutral Gas Desorption From Samples of Vacuum Chambers; M. Andritschky, O. Groebner, A. G. Mathewson, F. Schumann, P. Strubin and R. Souchet; Vacuum, vol. 38, Nos. 8–10, pp. 933 to 936, 1988, Pergamon Press Ltd.

*Primary Examiner*—Jill Warden
*Assistant Examiner*—Saeed Chaudhry
*Attorney, Agent, or Firm*—Evenson, McKeown, Edwards & Lenahan, P.L.L.C.

[57] ABSTRACT

A rod driver is used to drive a rod so as to move a broach through a continuous vacuum chamber in the axial direction. The broach is provided at the leading end of the rod with cutting and finishing edges at a plurality of stages in the axial direction. The cutting edges each have chip breakers in their outer periphery. The broach is moved in the vacuum chamber to cut the inner surface of the vacuum chamber, so that a new surface is formed. During the cutting at least one of an inert gas, nitrogen, and a mixture of the inert gas and nitrogen is supplied to the cutting edges. The outer diameter of the finishing edge is same as the desired inner diameter of the vacuum chamber and the finishing edges are effective in forming such a vacuum chamber with greater precision and the least friction. As a contaminated and decomposed layer on the inner surface of the vacuum chamber is removed in the axial direction of the inner surface of the vacuum chamber for certain, moreover, gas desorption, from a new surface, originating from thermal desorption and photodesorption generated at the time of synchrotron radiation can be minimized to satisfy a requirement for a vacuum vessel.

4 Claims, 9 Drawing Sheets

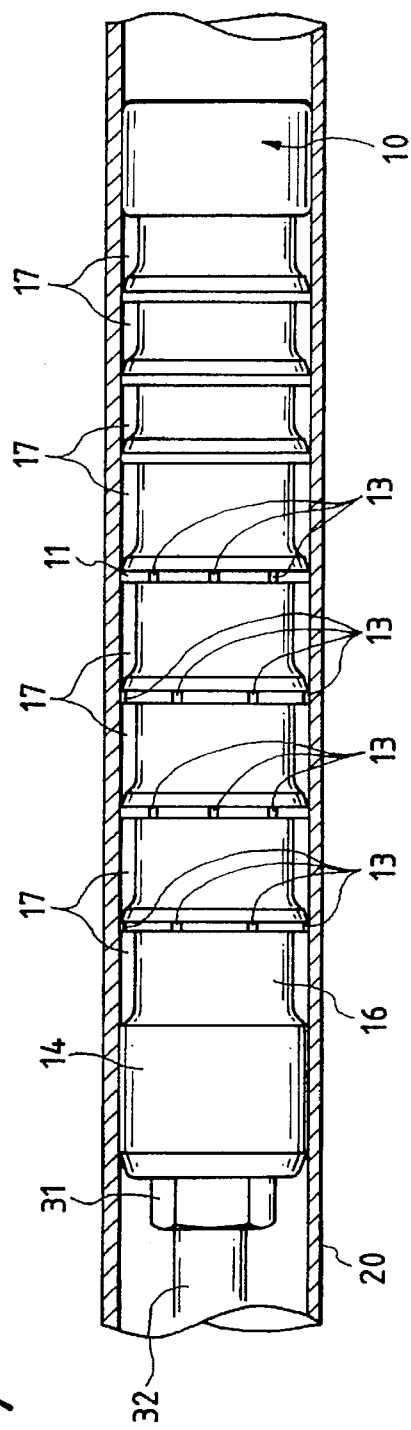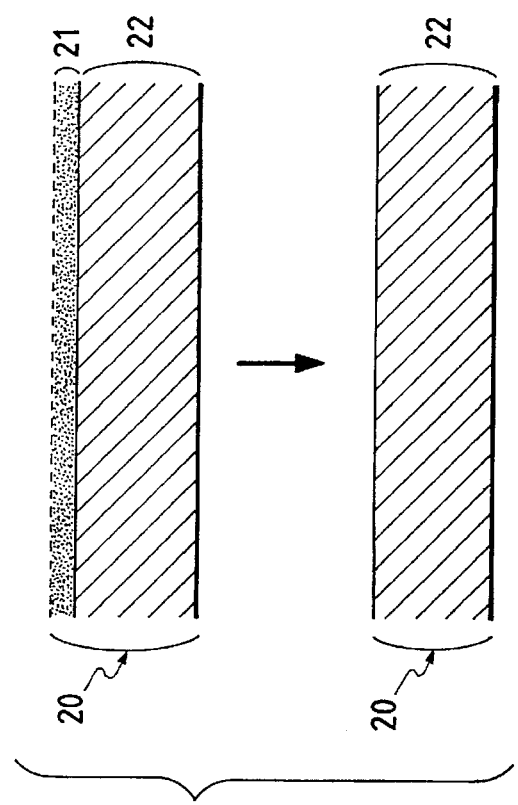
FIG. 7
FIG. 8

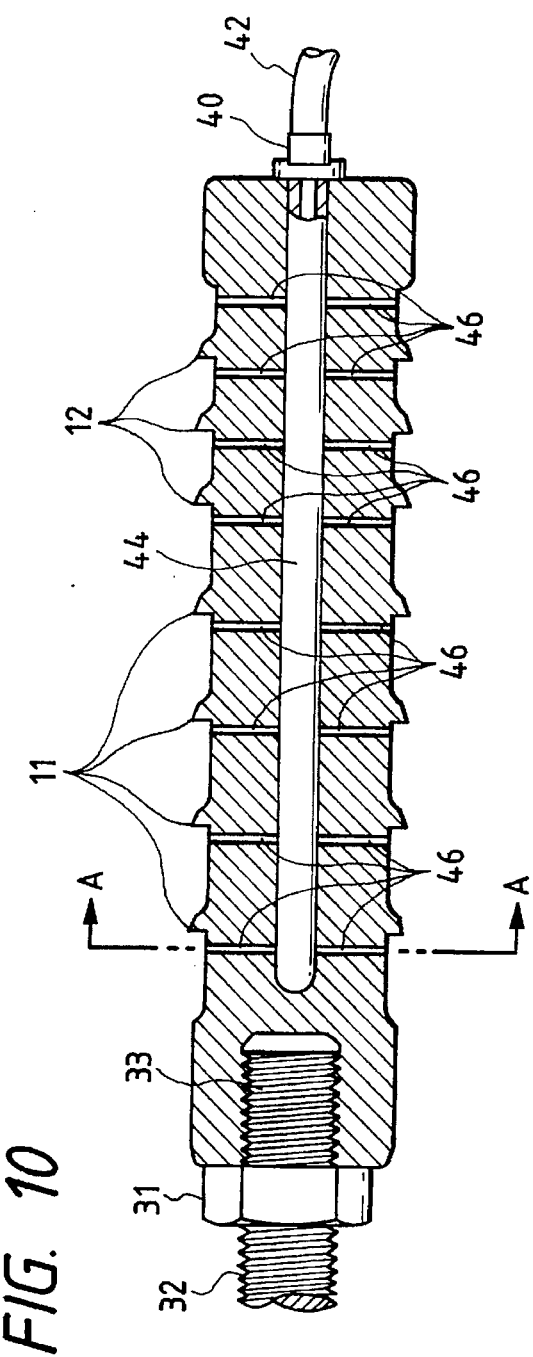
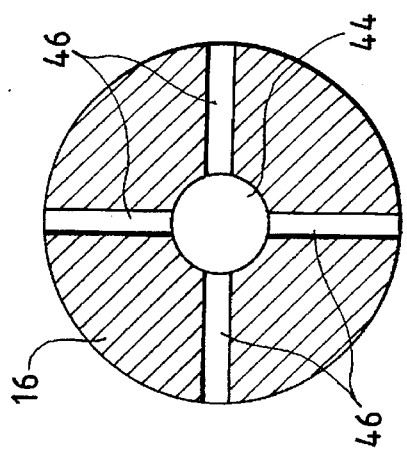

PROCESS AND APPARATUS FOR TREATING INNER SURFACE TREATMENT OF CHAMBER AND VACUUM CHAMBER

BACKGROUND OF THE INVENTION

The present invention relates to a process and apparatus for treating the inner surface of a vacuum chamber, and more particularly to a process for treating the inner surface of a vacuum chamber for use as a vacuum vessel such as a vacuum chamber in a charged particle accelerator to reduce gas desorption from the inner surface of the vacuum chamber produced by at least either thermal desorption or photodesorption.

In order to accelerate charged particles with high energy in a charged particle accelerator, it is necessary to prevent charged particles from scattering because of a collision of charged particles with residual gases, that is, to prevent the loss of such charged particles. The environment in which the charged particles are accelerated should be set in a ultrahigh vacuum to prevent such a loss. Consequently, a vacuum vessel such as a ultra—clean vacuum chamber and the like is employed in the charged particle accelerator to actually attain a high or ultrahigh vacuum environment. Moreover, the most important task is to reduce the gas desorption from the vacuum vessel itself in addition to increasing the pumping speed of a vacuum pump to achieve a high or ultrahigh vacuum.

In this case, aluminum alloy, stainless steel, copper or the like is normally used for the vacuum vessel, called a vacuum chamber, of the charged particle accelerator. A factor governing gas desorption from the vacuum vessel using such a metal is thermal desorption in which absorbed molecules on the inner surface of the vacuum chamber are caused to be desorbed by thermal energy.

However, what greatly affects the pressure in the charged particle accelerator other than the normal thermal desorption originates from the presence of high-energy particles in the vacuum vessel. For example, electrons and positrons whose orbits have been altered by a bending magnet or the like in a electron storage ring generate electromagnetic waves called synchrotron radiation due to radiation. The inner wall of the vacuum chamber is irradiated with the synchrotron radiation, which causes gas desorption called photodesorption from the inner surface of the vacuum chamber.

With respect to photodesorption, a description has been given in "Vacuum" (volume 33, number 7 (1983) pp. 397–406). The gas desorption caused by the photodesorption raises the pressure in the vacuum chamber and results in introducing the scattering and attenuation of stored electrons.

In order to reduce gas desorption as much as possible, there have been proposed various methods of treating the inner surfaces of vacuum chambers for the purpose of not only cleaning the inner surfaces of vacuum chambers but also removing chemical compounds and contaminants causing such gas desorption. Chemical treatments using acid cleaning, alkali etching and the like are most common by used methods of treating the inner surfaces of vacuum chambers. Chemical treatments of the sort mentioned above have also been referred to in "Vacuum" (volume 38, number 8-10 (1988) pp. 933–936).

In addition to chemical treatments, there is a discharge cleaning method in which the inner surface of a vacuum vessel is bombarded with the ions generated by electric discharge. Moreover, another one known as a pre-baking treatment method comprises the steps of heating a vacuum chamber at high temperatures in a vacuum furnace to remove compounds on the inner surface of the vacuum chamber by evaporating them, and removing the gas contained in the material of the vacuum chamber by diffusing the gas so as to discharge the gas from the material. In this way, attempts have been made to reduce gas desorption from the inner surface of the vacuum chamber by cleaning the inner surface thereof.

In the aforementioned prior art, a lubricant may be used to reduce the friction between the material of a vacuum chamber and a plug or the like when a billet is formed by extrusion into a vacuum vessel such as the vacuum chamber of a charged particle accelerator. In this case, it is feared that a contaminated layer is formed on the inner surface of the vacuum chamber because of the lubricant. Thermal desorption or photodesorption may thus cause gas desorption from the contaminated layer.

When a vacuum chamber is formed by hot extrusion, moreover, a contaminated layer as a source of gas desorption may be formed as air and impurities react on the inner surface of the high-temperature vacuum chamber. In a case where a vacuum vessel is manufactured by roll-forming out of a rolled sheet, moreover, there also arises problems that such a contaminated layer is formed during the step of producing the sheet material by rolling.

In order to reduce gas desorption from the contaminated layer due to thermal desorption or photodesorption, the process of chemically treating the inner surface of the vacuum chamber needs changing depending on the material used when the inner surface is subjected to the chemical treatment. Nevertheless, there still arise problems that since chemicals are used, the inner surface of the vacuum chamber tends to become coarse in exchange for removal of the gas desorption layer, that the scale of facilities necessary for the inner surface treatment tends to become larger since those for rinsing the chemicals used for processing purposes and preventing environmental pollution are required, and that a compound layer as a source of gas desorption is newly formed on the inner surface.

In the case of the discharge cleaning utilizing ion bombardment, on the other hand, the gas itself used for discharge is allowed to penetrate into the vacuum chamber material and the problem is that the material itself has to be removed by sputtering. Further, the high-temperature heat treatment called pre-baking may incur a reduction in material strength since the vacuum chamber material passed through the heat treatment in the vacuum furnace becomes softened. Particularly, aluminum alloy, for example, is not fit for the pre-baking treatment in view of material strength as it may melt down. In addition, no consideration has been given to energy saving notwithstanding the use of such an energy-consuming vacuum furnace.

Incidentally, the vacuum chamber as an object for patent herein is generally as long as several meters and hardly fitted in a processing apparatus after it undergoes so-called machining such as boring. In other words, it has been difficult to treat the inner surface of such a vacuum chamber.

SUMMARY OF THE INVENTION

An object of the present invention is to provide a process for treating the inner surface of a vacuum chamber to ensure that a contaminated or decomposed layer as a source of gas desorption on the inner surface of a vacuum chamber such as a continuous vacuum chamber of which inner surface is difficult to be machined or bored.

Another object of the present invention is to provide an apparatus for treating the inner surface of a vacuum chamber to ensure that a contaminated or decomposed layer as a source of gas desorption on the inner surface of a vacuum chamber such as a continuous vacuum chamber of which inner surface is difficult to be machined or bored.

Still another object of the present invention is to provide a vacuum chamber so designed as to reduce gas desorption due to thermal desorption or photodesorption originating from a contaminated layer by applying the aforementioned process of treating the inner surface and to attain a high or ultrahigh vacuum environment when used as a vacuum vessel.

A further object of the present invention is to provide a vacuum chamber with a plurality of vacuum chambers coupled together for a charged particle accelerator.

In a first embodiment of the present invention made to accomplish the object above, a broach having at least one cutting edge which is in contact with the inner surface of a vacuum chamber and has cutouts in its outer periphery is used to cut off a contaminated layer on the inner surface of the vacuum chamber while the broach and the vacuum chamber are unidirectionally moved relatively to each other in the axial direction.

Preferably, the contaminated layer on the inner surface of the vacuum chamber is cut off while at least either inert gas or a mixture of nitrogen and inert gases is being supplied to the cutting surface of the vacuum chamber being treated by the broach.

Further, the contaminated layer on the inner surface of the vacuum chamber is preferably cut off while a solvent for the contaminants contained in the contaminated layer is being supplied to the surface of the vacuum chamber being cut by the broach.

Still further, the contaminated layer on the inner surface of the vacuum chamber is preferably cut off while at least either inert gas or a mixture of nitrogen and inert gases is being supplied to the cutting surface of the vacuum chamber and while a solvent for the contaminants contained in the contaminated layer is being supplied to the surface of the vacuum chamber being cut by the broach.

In a second embodiment of the present invention, a process for treating the inner surface of a vacuum chamber wherein a broach having a plurality of cutting edges each having cutouts in their outer peripheries is used to cut off a contaminated layer on the inner surface of the vacuum chamber by unidirectionally moving the broach and the vacuum chamber relatively to each other in the axial direction and wherein finishing edges, as an integral part of the broach, having the same external diameter as that of the final-stage cutting edge in the axial direction are used to finish the inner surface of the vacuum chamber with predetermined precision.

A third embodiment of the present invention comprises a support, means for anchoring a vacuum chamber to the support and holding the vacuum chamber, a broach having at least one cutting edge which is in contact with the inner surface of the vacuum chamber and has cutouts in its outer periphery, and broach drive means to which the broach arranged on the support is fitted. The broach drive means unidirectionally moves the broach relatively to the vacuum chamber in the axial direction to cut off a contaminated layer on the inner surface of the vacuum chamber.

A fourth embodiment of the present invention comprises a support, a broach having at least one cutting edge having cutouts in its outer periphery and an outer peripheral configuration, excluding the cutouts, substantially similar to the inner peripheral configuration of a vacuum chamber as an object to be treated, means for anchoring the broach to the fitting support, and vacuum chamber drive means for holding the vacuum chamber and unidirectionally moving the vacuum chamber relatively to the broach in the axial direction to cut off a contaminated layer on the inner surface of the vacuum chamber.

A fifth embodiment of the present invention comprises a support, means for anchoring a vacuum chamber to the support and holding the vacuum chamber, a broach having a plurality of cutting edges having cutouts, and broach drive means to which the broach arranged on the support is fitted. The broach drive means unidirectionally moves the broach relatively to the vacuum chamber in the axial direction to cut off a contaminated layer on the inner surface of the vacuum chamber. The outer diameter of each cutting edge, excluding the cutouts, is set greater than that of the immediately preceding one in the direction of the rearmost edge face from the front edge face.

Preferably, at least one cutout is provided in the circumferential direction of each cutting edge and cut through the cutting edge in the axial direction of the broach, and the cutouts of the adjoining cutting edges are mutually located at different circumferential positions.

Further, the broach is preferably provided with finishing edges having the same contour and dimension excluding the final-stage cutting edge and its cutouts. The finishing edges are used to finish the inner surface of the vacuum chamber with predetermined precision.

Still further, the broach is preferably provided, between the adjoining cutting edges and between the finishing edges, with a chip storage space large enough to accommodate chips of the contaminated layer and hold them until the broach slips out of the rear end of the vacuum chamber.

Still further, there may be arranged a liner for putting the height of the vacuum chamber and the cutting edge of the broach in correct alignment on at least one side of the vacuum chamber where the broach is fitted in.

Still further, there may be arranged a front guide on at least one side of the vacuum chamber where the broach is fitted in.

Still further, there may be provided means for supplying either inert gas or a mixture of nitrogen and inert gases, or lower alcohol to the surface of the vacuum chamber being cut by the broach. In this case, the means for supplying the fluid to the cut surface may include a main fluid channel formed in the axial direction of the broach shaft of the broach and jet channels radially extending from the main fluid channel.

Another embodiment of the present invention includes providing a vacuum chamber whose contaminated layer on the inner surface thereof has been cut off through the process of treating the inner surface of the vacuum chamber or a vacuum chamber whose contaminated layer on the inner surface thereof has been cut off by an apparatus for treating the inner surface of the vacuum chamber.

In still another embodiment of the present invention, flanges each provided on both sides of the vacuum chamber are fitted with second flanges that can be coupled to the former flanges, respectively, to form a vacuum vessel and there are provided means for evacuating inside the space formed in the vacuum vessel, and also means for accelerating charged particles existing in the internal space of the vacuum vessel thus evacuated.

Even though such a contaminated layer originating from a lubricant and the like is formed at the time of extrusion forming, the broach having at least one cutting edge in the axial direction or what is similar in contour to the vacuum chamber is used according to the present invention to cut off the contaminated layer on the inner surface of the vacuum chamber by moving the broach relatively to the vacuum chamber in the axial direction to ensure that the contaminated layer is removed. Consequently, the release, from the inner surface of the vacuum chamber, of gas stored in the contaminated layer due to thermal desorption or photodesorption is greatly reduced.

By supplying at least either inert gas as a single substance or the mixture of nitrogen and inert gases to the surface of the vacuum chamber to be cut by the broach or otherwise supplying lower alcohol as a solvent for the contaminants contained in the contaminated layer to the surface of the vacuum chamber to be cut thereby, the contaminated layer on the inner surface of the vacuum chamber is scraped off, so that the effect of reducing gas desorption is increased with efficiency. In this case, the use of finishing edges having substantially the same contour and dimension as those of the final-stage cutting edge makes it possible to increase precision on the inner surface of the vacuum chamber.

In order to move the broach relatively to the vacuum chamber, there are two methods that can be employed: one for moving the vacuum chamber while the broach is fixed and another for moving the broach while the vacuum chamber is fixed. In the case of the former, an apparatus for treating the inner surface of a vacuum chamber comprises a support, means for anchoring the vacuum chamber to the support, a broach having at least one cutting edge whose contour is substantially similar to the inner contour of the vacuum chamber, and broach drive means for moving the broach in the axial direction of the vacuum chamber to cut off the contaminated layer on the inner surface of the vacuum chamber. Whereas in the case of the latter, an apparatus for treating the inner surface of a vacuum chamber comprises a support, means for anchoring to the support a broach having at least one cutting edge whose contour is substantially similar to the inner contour of the vacuum chamber, and vacuum chamber drive means for moving the vacuum chamber in the axial direction of the vacuum chamber to cut off the contaminated layer on the inner surface of the vacuum chamber.

In a case where the broach has the plurality of cutting edges in any one of the apparatus for treating the inner surface of a vacuum chamber, cutting will be carried out smoothly if the outer diameter of each cutting edge ranging from the front stage to the final stage of the broach is set greater than that of the immediately preceding one. In the case of the broach having the plurality of cutting edges, chips will be preventing from growing longer and from being caught by the cutting edge coming up from the rear, provided at least one cutout (chip breaker) is made in the circumferential direction of each cutting edge in such a manner that the cutouts of the lengthwise adjoining cutting edges are not overlapped in the circumferential direction.

Moreover, the provision of a plurality of finishing edges for finishing the inner surface of the vacuum chamber with predetermined precision, the finishing edge being substantially similar in contour and dimension to the final-stage cutting edge, makes available an inner surface offering desired smoothness. Since a sufficiently-large chip storage space is formed between the lengthwise adjoining cutting edges and between the finishing edges, chips are prevented from being caught by the cutting edge coming up from the rear. The use of the liner for putting the inner surface of the vacuum chamber and the cutting edge of the broach in correct alignment on either one side of the vacuum chamber where the broach is fitted in or the other where it is drawn allows the cutting edge to be smoothly driven at the front and rear ends of the vacuum chamber. The provision of the front guide on one side of the vacuum chamber where the broach is fitted in and a rear guide on the other side behind the finishing edge also allows the broach to be smoothly fitted in and drawn.

Even though such a contaminated layer originating from a lubricant and the like is formed at the time of extrusion forming, the broach is used according to the present invention to cut off the contaminated layer on the inner surface of the vacuum chamber to ensure that the contaminated layer is removed. Consequently, the release, from the inner surface of the vacuum chamber, of gas stored in the contaminated layer due to thermal desorption or photodesorption is considerably reduced. It can also be dispensed with to subject the inner surface to chemical treatment, which makes unnecessary any facility for use in applying chemical treatment, rinsing chemicals after treatment, preventing environmental pollution or the like. In addition, there is no possibility that the inner surface of the vacuum chamber is damaged by the chemical treatment. Basically, it is improbable for a compound layer as a source of gas desorption to be newly generated when such a chemical treatment is applied to the inner surface of the vacuum chamber.

As discharge cleaning utilizing ion bombardment is not needed, on the other hand, discharged gas is prevented from penetrating into the vacuum chamber, and vacuum chamber material is also prevented from being sputtered during the discharge cleaning process. As no high-temperature heat treatment for pre-baking is required, not only the softening of the vacuum chamber material resulting from such high-temperature heat treatment in a vacuum furnace but also a reduction in the strength of the vacuum chamber material is prevented. Moreover, an energy-consuming vacuum furnace can also be dispensed with and this will contributes to energy saving.

In other words, the process and apparatus for treating the inner surface of a vacuum chamber according to the present invention can be employed for obtaining a vacuum chamber in which the gas desorption caused by thermal desorption and photodesorption originating from synchrotron radiation has been reduced.

BRIEF DESCRIPTION OF THE DRAWINGS

FIG. 7 is a partial sectional elevational view of a broach and a vacuum chamber to illustrate a chip storage.

FIG. 8 is a diagram schematically showing the conditions of the inner surface of a vacuum chamber before and after planing.

FIG. 10 is a vertical sectional view of the internal structure of a broach capable of supplying gas and alcohol to the cutting surface of a vacuum chamber according to the present invention.

FIG. 11 is a sectional view taken on line A—A of FIG. 10.

DESCRIPTION OF THE PREFERRED EMBODIMENTS

Figure 1:
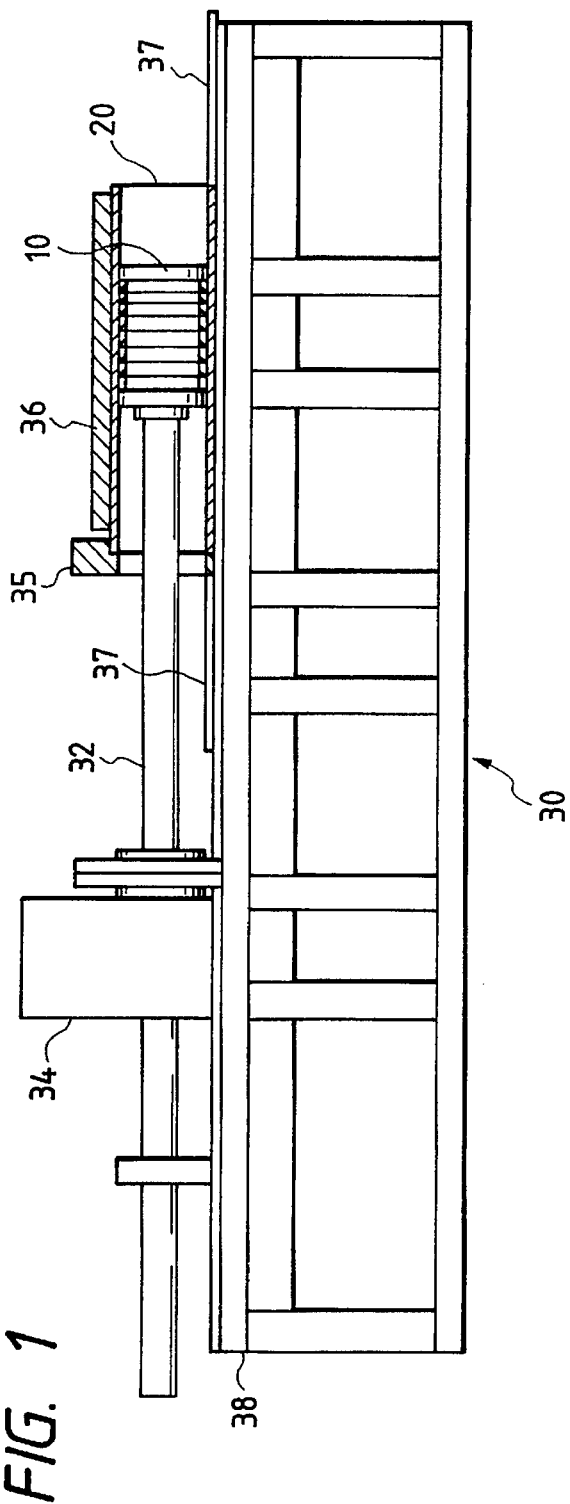
FIG. 1 is an elevational view of an apparatus for treating the inner surface of a vacuum chamber according to the present invention with a schematic illustration of its construction, part of which is shown in cross section.

Referring to the drawings, a description will be given of a process and apparatus for treating the inner surface of a vacuum chamber and a vacuum chamber.

FIG. 1 is an elevational view of an apparatus for treating the inner surface of a vacuum chamber according to the present invention with a schematic illustration of its construction, part of which is shown in cross section. An apparatus 30 for treating the inner surface of a vacuum chamber embodying the present invention comprises a broach 10 having a plurality of cutting edges, a rod 32 whose one end is coupled to the broach 10 and which is used to move the broach 10, a rod driver 34 for giving driving force to the rod at one end opposite to the other where the rod 32 is coupled to the broach 10, a chamber stopper 35 and a vacuum chamber anchoring tool 36 for anchoring a vacuum chamber 20 as an object to be treated, a liner 37 for putting the vertical positions of the cutting edges of the broach 10 and the inner surface of the vacuum chamber 20 in correct alignment so that the broach 10 may be fitted into and drawn from the vacuum chamber 20, and a support 38 for loading the vacuum chamber 20 as an object to be treated. The vacuum chamber 20 is used as a vacuum vessel or vacuum chamber which accelerates or stores electrons and positrons after the inner surface treatment is completed as will be described later.

Figure 2:
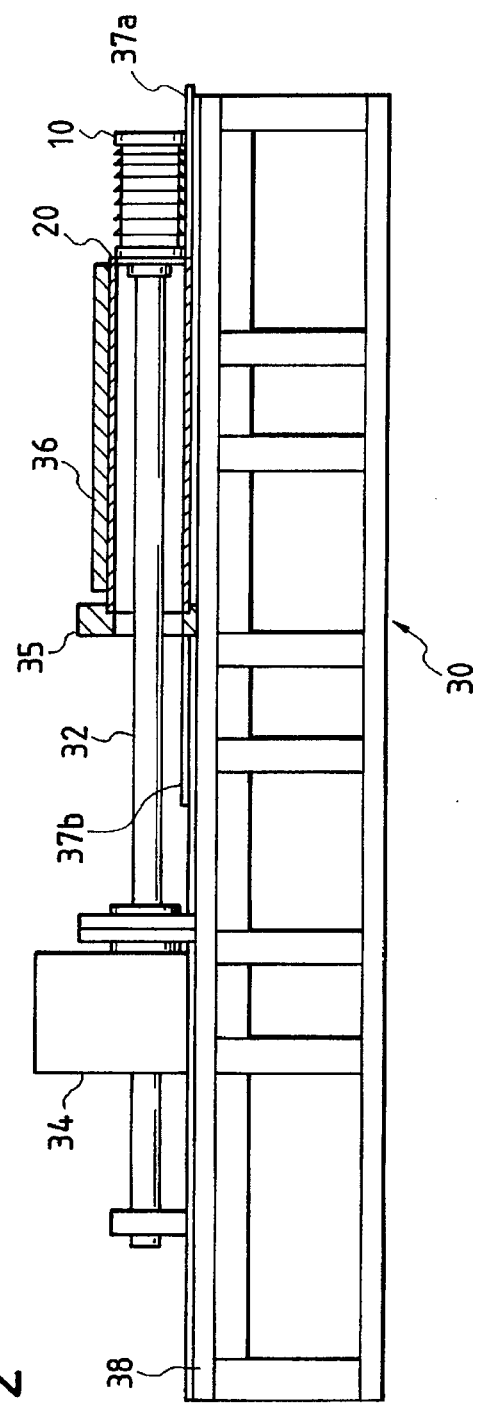
FIG. 2 is a diagram illustrating the broach set at the right end of the vacuum chamber to treat the inner surface thereof.
Figure 3:
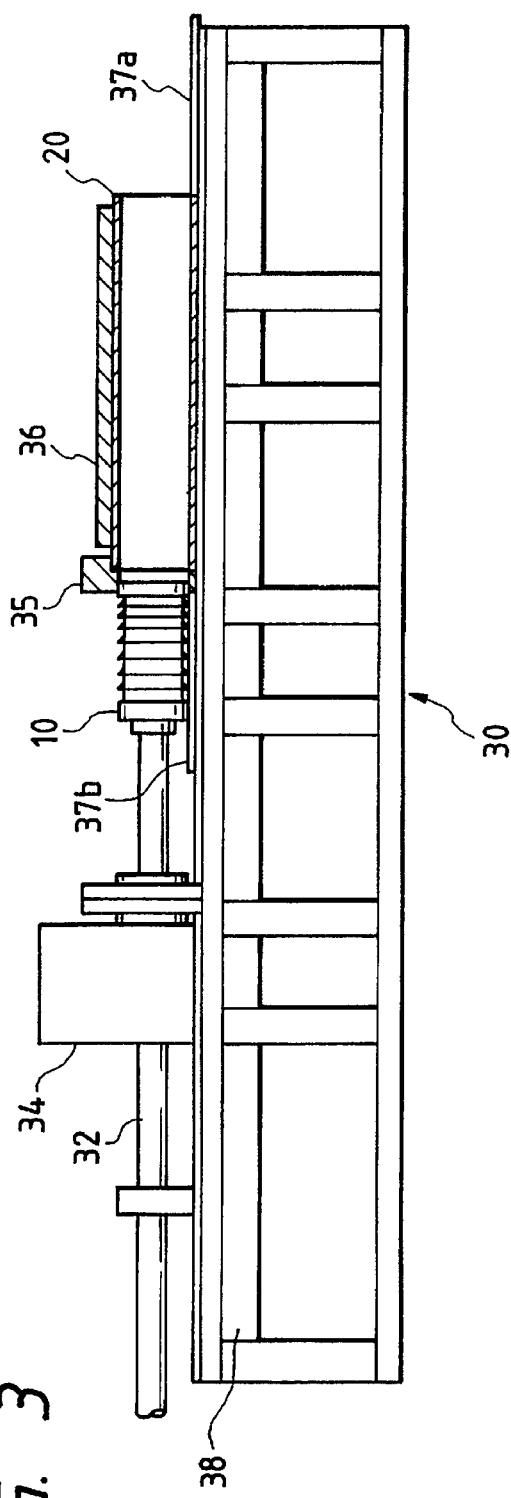
FIG. 3 is a diagram illustrating a state in which the broach used to cut the inner surface of the vacuum chamber is positioned outside the vacuum chamber.

Referring to FIGS. 1 to 3 inclusive, a procedure for implementing the process for treating the inner surface of a vacuum chamber according to the present invention will be illustrated.

FIG. 2 is a diagram illustrating the broach 10 set at the right end of the vacuum chamber 20 immediately before the inner surface thereof is treated. Before the inner surface treatment, the vacuum chamber 20 is formed so that it has a desired contour normally by extrusion or drawing. The vacuum chamber is made of stainless steel, aluminum alloy, copper or the like. The vacuum chamber 20 having the desired contour is placed on the support 38 of the apparatus 30 for treating the inner surface of a vacuum chamber and anchored on the support 38 by means of the vacuum chamber stopper 35 and the anchoring tool 36.

The broach 10 having cutting edges substantially similar in contour to the inside of the vacuum chamber 20 is coupled to one end of the rod 32. The rod 32 is passed through the vacuum chamber 20 and linearly driven by the rod driver 34 in the axial direction, that is, from right to left in the drawings. The broach 10 is located on a liner 37a for putting the vertical positions of the cutting edges of the broach 10 and the inner surface of the vacuum chamber 20 in correct alignment.

Subsequently, the rod driver 34 is started to linearly drive the rod 32 toward the left-hand side. In a case where the rod 32 is a ball screw, the rod driver 34 is what has a gear for driving the ball screw, a motor and the like. Since a linear movement is essential to the rod 32, what is capable of hydraulic linear driving may be employed as the rod driver 34. When the rod driver 34 is operated, the broach 10 coupled to the rod 32 is fitted into the vacuum chamber 20 and moved forward while cutting edges formed on the outer periphery of the broach 10 are cutting the inner surface of the vacuum chamber 20. At this time, the vacuum chamber 20 receives counter force accompanying the inner surface cutting and what causes the vacuum chamber 20 to move in the direction in which the broach 10 moves. However, the vacuum chamber stopper 35 resists against the force and prevents the vacuum chamber 20 from moving in the same direction. Simultaneously, the vacuum chamber anchoring tool 36 prevents the vacuum chamber 20 from moving vertically even if the vacuum chamber 20 receives force in the vertical direction with respect to the direction in which the broach 10 moves forward.

While cutting the inner surface of the vacuum chamber 20, the broach 10 moved to the left by the rod 32 moves further forward. FIG. 1 refers to a state wherein the broach 10 is inside the vacuum chamber 20 and FIG. 3 to what shows the broach 10 outside the vacuum chamber 20 after it has completed the operation of cutting the inner surface of the vacuum chamber 20.

A liner 37b is arranged on the support 38 so as to put the surface of the cutting edge on the broach 10 and the inner surface of the vacuum chamber 20 in correct alignment when the broach 10 is drawn out of the vacuum chamber 20. The broach 10 is drawn in such a manner that it is mounted on the liner 37b.

When the broach 10 is moved like this in the vacuum chamber 20, the inner surface of the vacuum chamber 20 is subjected to inner surface treatment by cutting. Since the vacuum chamber 20 as an object to be treated is as long as several meters, the so-called boring applicable only to small parts is not applicable in this case. However, the apparatus for treating the inner surface of a vacuum chamber using a broach for cutting makes it possible to subject any vacuum chamber to boring that has heretofore been difficult to use for cutting the inner surface of any long vacuum chamber. The effect of such an inner surface treatment will be described later.

Referring to FIGS. 4 to 7 inclusive, a description will subsequently be given of a broach for use in the apparatus for treating the inner surface of a vacuum chamber as shown in FIG. 1.

Figure 4:
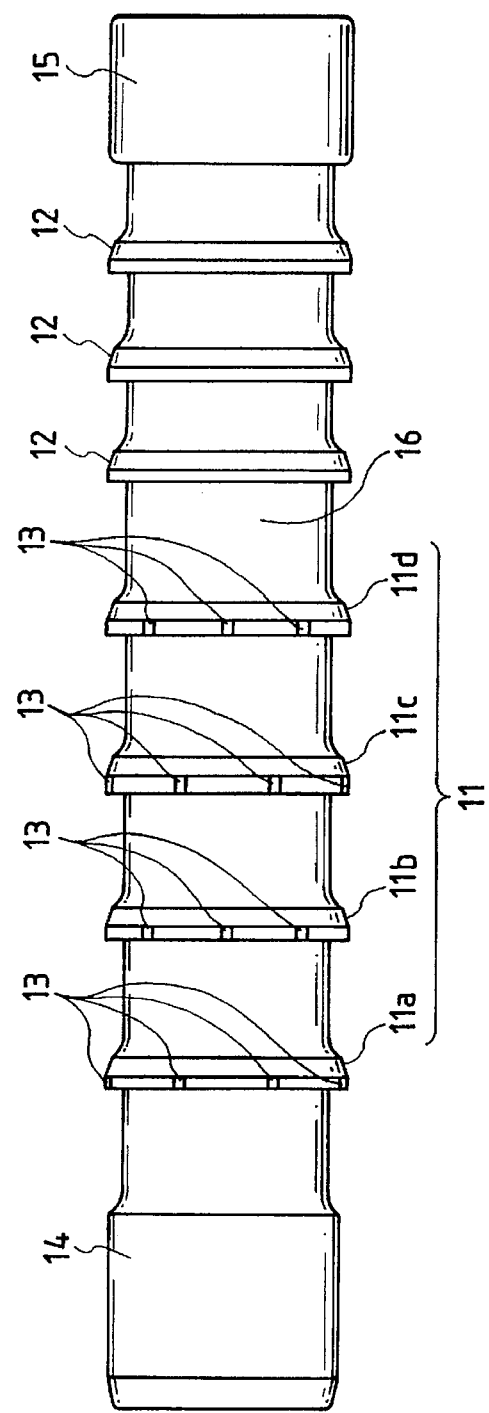
FIG. 4 is an elevational view of a broach with its structure shown by way of illustration.

FIG. 4 is an elevational view of the broach 10. The broach 10 includes a broach shaft 16 as the nucleus and is provided with a front guide 14 as a guide for use when it proceeds through the vacuum chamber 20. Cutting edges 11a to 11d are formed behind the front guide 14. With respect to the plurality of cutting edges 11a to 11d for cutting the inner surface of the vacuum chamber 20, their outer diameter slightly decreases in the backward direction of the broach 10. Regarding the vacuum chamber 20 which is circular in cross section, for example, the diameter of the cutting edge 11b is greater than that of the cutting edge 11a, and the diameter of the cutting edge 11c is grater than that of the cutting edge 11b.

In an example of the broach 10 shown in FIG. 4, the diameter of the cutting edge 11d is greatest and this diameter is made a finishing dimension of the inner surface of the vacuum chamber 20. With the dimension of the cutting edge 11 like this, the inner surface of the vacuum chamber 20 is cut each time the cutting edge 11 of the broach 10 passes through the vacuum chamber 20 and the inner diameter of the vacuum chamber 20 is thus enlarged. The machining precision of the inner diameter dimension can be increased by decreasing the quantity of the cutting carried out by one cutting edge 11. Although there are four cutting edges 11 in an example of the broach 10 shown in FIG. 4, the number of cutting edges should be determined in accordance with the finishing dimension and a margin to be cut up.

Finishing edges 12 are formed behind the final-stage cutting edge 11d. The diameter of the finishing edge 12 is the same as that of the final-stage cutting edge 11 and the number of finishing edges is determined in accordance with the finishing surface precision. In order to reduce surface roughness, the number of finishing edges 12 may be increased. There are three finishing edges attached in this embodiment of the present invention. The shape of the edge also affects the finishing surface precision.

A rear guide 15 is provided behind the finishing edge 12 and together with the front guide 14, used to guide the broach 10 when it proceeds in the vacuum chamber 20. The rear guide 15 may be omitted, depending on the number of finishing edges 12 since the diameter of the rear guide 15 is the same as that of the finishing edge 12.

The cutting edge 11 is provided with cutouts called chip breakers 13.

Figure 5A:
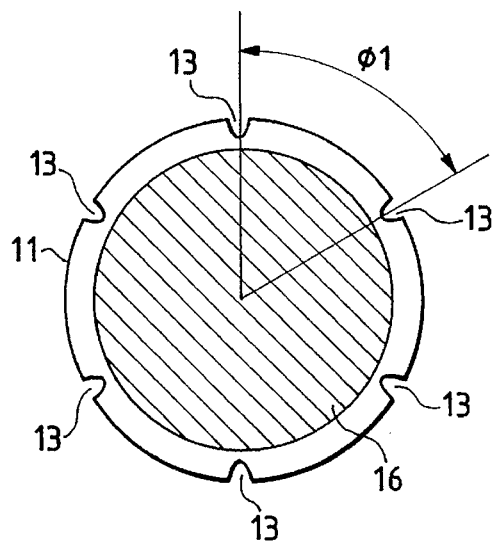
FIGS. 5a, 5b are sectional views of broaches as viewed from the direction in which the cutting edge is moved, with chip breakers arranged as shown therein.
Figure 5B:
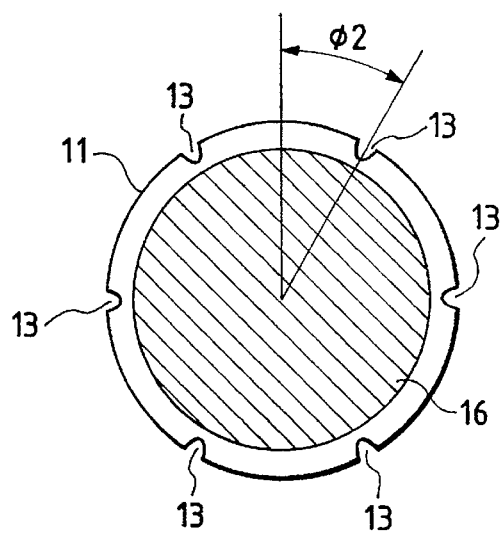

FIGS. 5a, 5b are sectional views of broaches 10 with illustrations of chip breakers. FIGS. 5a, 5b are those viewed from the direction in which the cutting edge 10 is moved. The cutting edges 11 are formed on the outer periphery of the broach shaft 16. The adjoining cutting edges 11 are illustrated in FIGS. 5a, 5b. In an example of the broach 10 of FIG. 4, 11a and 11c represent the cutting edge shown in FIG. 5a, whereas 11b and 11d represent what is shown in FIG. 5b.

As the broach 10 proceeds in the vacuum chamber 20, the cutting edges 11 cut the inner surface of the vacuum chamber 20 and produce thin chips. As the chip continuously grows longer in the circumferential direction of the cutting edge 11, it may be caught by the next cutting edge 11 and may scratch the inner surface of the vacuum chamber 20, thus badly affecting the planing of the surface thereof.

Since the broach 10 is provided with the chip breakers 13 in this embodiment of the invention, the chip is broken at the position of the chip breaker 13. The chip breakers 13 thus work to cut the chips in lengths lest they continuously grow longer in the circumferential direction and the chips are prevented from being caught up by the cutting edge 11 coming up from the rear, that is, from badly affecting the operation.

As shown in FIGS. 5a, 5b, different circumferential positions have been assigned to the respective chip breakers 13, with a phase difference(f1–f2) provided. The chip breakers 13 are cutouts and the vacuum chamber is not cut at these positions. When the outer diameter of the cutting edge 11 coming up from the rear is greater than that of the preceding one, no cutting is carried out at the circumferential position corresponding to the chip breaker 13 of the preceding cutting edge 11. Then the cutting edge 11 coming up from the rear will have to cut the portion left out by the preceding one and the cutting quantity tends to increase. In order to prevent the cutting quantity from excessively increasing in a specific portion, it is only needed to provide a phase difference between the chip breakers by continuously arranging cutting edges having the same outer diameter. Consequently, it has been arranged in this embodiment of the invention that at least the adjoining cutting edges 11 have the chip breakers 13 at different positions, so that the portion left uncut by the chip breaker 13 of the preceding cutting edge 11 is cut by the next one.

Although 11a and 11c are assumed representative of the cutting edges in FIG. 5a, and 11b and 11d representative of those shown in FIG. 5b for convenience of illustration in this embodiment of the invention, that is, the cutting edges 11a, 11c are set in phase with each other, the cutting edges 11a, 11b, 11c and 11d may needless to say be set so that they should mutually have an equal phase difference.

Figure 6:
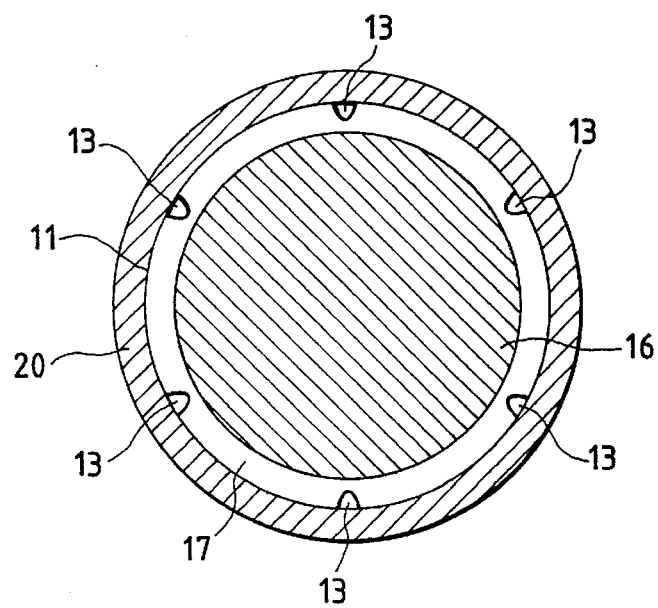
FIG. 6 is a sectional side view of a broach for use in cutting the inner surface of a circular vacuum chamber to treat the surface thereof.

FIG. 6 is a sectional side view of the broach 10 for use in cutting the inner surface of the circular vacuum chamber 20 to treat the surface thereof. A chip storage space 17 is formed between the vacuum chamber 20 and the broach shaft 16. Given that the outer diameter of the broach shaft 16 is d1 and that the inner diameter of the vacuum chamber 20 is d2, the height of the chip storage space 17 in the radial direction becomes (d2–d1) / 2.

FIG. 7 is a partial sectional elevational view of broach 10 and the vacuum chamber 20 to illustrate the function of the chip storage space 17. The broach 10 proceeds to the left in the vacuum chamber 20 to treat the inner surface of the vacuum chamber 20. The rod 32 is coupled to the front guide 14 of the broach 10 and secured to the broach 10 with a nut 31. The chip storage space 17 is provided in between the broach shaft 16 and the inner surface of the vacuum chamber 20. The chips produced by the cutting edge 11 are retained in the chip storage space 17 and held between the broach 10 and the vacuum chamber 20; therefore, the cutting surface is prevented from being scratched thereby.

Figure 9:
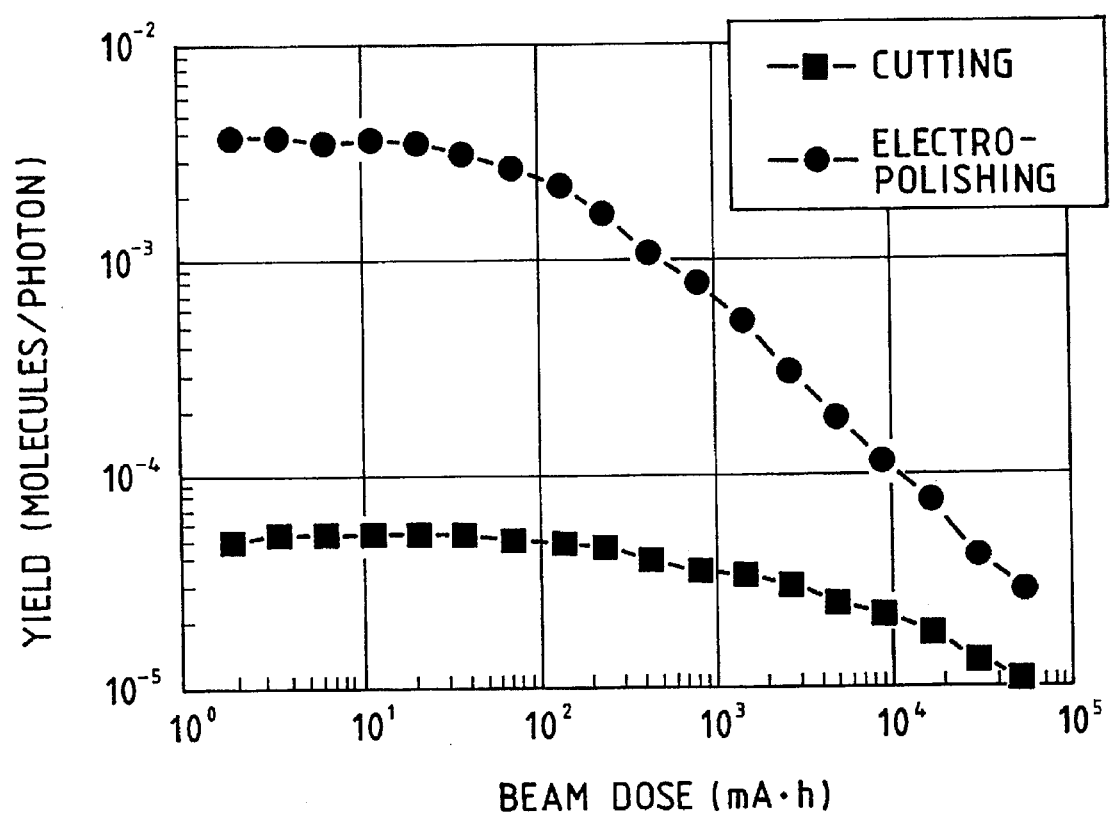
FIG. 9 is a graphic representation illustrating results of photodesorption tests with synchrotron radiation by way of example.

Referring to FIGS. 8 and 9, the effect of the process of treating the inner surface of a vacuum chamber will subsequently be described.

FIG. 8 is a diagram exemplary illustrating the conditions of the inner surface of a vacuum chamber before and after cutting. There exists a contaminated and decomposed layer 21 on the inner surface of the vacuum chamber 20 as a result of extrusion or drawing carried out to form the vacuum chamber at the preceding step before the broach 10 is used for cutting purposes.

When the broach 10 is used to treat the inner surface of the vacuum chamber, the contaminated and decomposed layer 21 on the surface thereof is removed and a vacuum chamber material 22 appears as the outermost layer. Consequently, not only gas desorption from the vacuum chamber due to thermal desorption but also photodesorption based on synchrotron radiation in an electron storage ring is considerably reduced when the vacuum chamber is used.

FIG. 9 is a graphic representation illustrating results of photodesorption tests with synchrotron radiation by way of example. The graph shows the results of irradiation of synchrotron radiation generated in the electron storage ring on oxygen-free copper subjected to two kinds of inner surface treatments. The integrated values of radiation dosage are shown on the abscissa axis, the values corresponding to the number of irradiated photons after synchrotron radiation is exposed. Whereas yield values are shown on the ordinate axis, each indicating the number of photons desorbed by one photon, and equivalent to the quantity of gas desorption. If the yield value is small, photodesorption from the vacuum vessel will be low and the scattering probability of charged particles revolving in the vacuum chamber will become lower. Therefore, the life of the charged particles is prolonged when the yield value is small and this makes available a high-performance vacuum chamber for use as an accelerator vacuum chamber.

As shown in FIG. 9, the yield value in the inner surface cutting treatment is lower in the whole irradiation area than what is obtained from the conventional electrolytic polishing treatment. Therefore, the contaminated layer 21 as a source of gas desorption is more effectively removed by cutting the inner surface than the case of electrolytic polishing, and gas desorption is smaller. Moreover, an inner surface layer as a source of gas desorption is hardly formed during the inner surface cutting treatment in comparison with the electrolytic polishing treatment. In other words, it is presumed that the electrolytic polishing newly forms an oxide due to the polishing work during the inner surface treatment. This also proves that the technique of removing the contaminated layer 21 by means of the inner surface treatment using such a broach is more effective in reducing gas desorption than the surface treatment using electrolytic polishing.

Referring to FIGS. 10 and 11, a description will subsequently be give of a process for treating the surface of a vacuum chamber by supplying fluid to the cutting surface.

FIG. 10 is a vertical sectional view of a broach capable of supplying gas and liquid to the cutting surface of a vacuum chamber. In this embodiment of the invention, a main fluid channel 44 is formed close to the central part of the broach 10 in the axial direction of the broach 10 from the rear end of the rear guide 15. Jet channels 46 are also formed radially from the main fluid channel 44 toward the outside of the broach.

FIG. 11 is a sectional view taken on line A—A of FIG. 10, wherein the main fluid channel 44 and the jet channels 46 are formed in the broach shaft 16. A plug 40 is provided at the entrance of the main fluid channel 44 of the rear guide 15 of the broach 10 and used for introducing fluid such as gas and liquid. When a hose 42 is coupled to the plug 40, the fluid can be supplied to the vacuum chamber 20 from the outside.

A description will subsequently be given of the effect of the invention at the time the inner surface treatment is made while fluid is being supplied. The fluid supplied via the hose 42 to the main fluid channel 44 is passed through the jet channels 46 before being jetted in between the cutting edge 11 and the inner surface of the vacuum chamber being cut thereby. As shown in the embodiment of FIG. 8, the material 22 of the vacuum chamber 20 is exposed when the contaminated and decomposed layer 21 is cut off.

In this embodiment of the invention, the inner surface of the vacuum chamber may be protected by controlling the conditions thereon since the inner surface thereof is cut while a specific gas or liquid is being supplied at the time the inner surface treatment is made. The inner surface of the vacuum chamber 20 exposed at the time of cutting can be prevented from being oxidized because of the atmosphere created by supplying inert gas such as argon gas.

A liquid may also be supplied during the inner surface treatment. Lower alcohol or the like may be used in this case. While such lower alcohol is being supplied, cutting may be carried out to prevent the layer thus exposed from being contaminated again by removing those soluble by the solvent.

When the contaminated layer is cut off, gas together with the liquid may be supplied. With the gas and the liquid supplied in combination, the respective effects may simultaneously be obtained. In the case of the process of treating the inner surface of the vacuum chamber by supplying gas or liquid to the cutting surface thereof as shown in FIGS. 10 and 11, the gas or liquid is supplied from the rear end of the broach 10 through the broach shaft 16. However, the gas or liquid may be supplied from the front side of the broach 10 along the rod 32.

Figure 12:
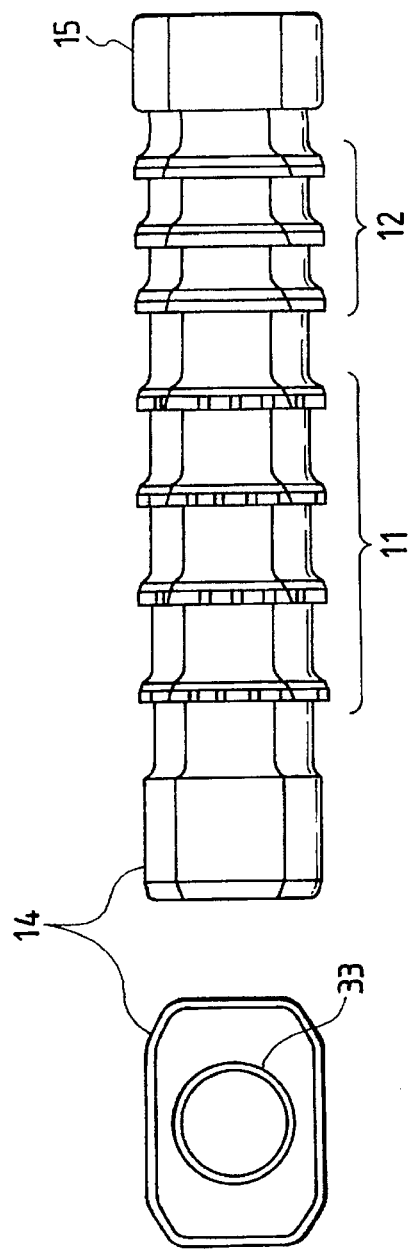
FIG. 12 is an elevational view of a broach for use in treating the inner surface of a rectangular vacuum chamber according to the present invention.

FIG. 12 is an elevational view of a broach for use in treating the inner surface of a rectangular vacuum chamber. In this embodiment of the invention, the vacuum chamber is octagonal in cross section and even if it is polygonal in cross section, the constitutional elements of the broach 10 are basically similar to those used in the case of the circular one of FIG. 4; namely, the broach 10 comprises the front guide 14, the cutting edges 11 each having the chip breakers 13, the finishing edges 12, and the rear guide 15. The effect of this embodiment of the invention is similar to what has been described in reference to the broach 10 circular in cross section of FIG. 4. In a side view of FIG. 12, a coupling bolt hole 33 is provided to couple the front guide 14 to the rod 32.

Figure 13:
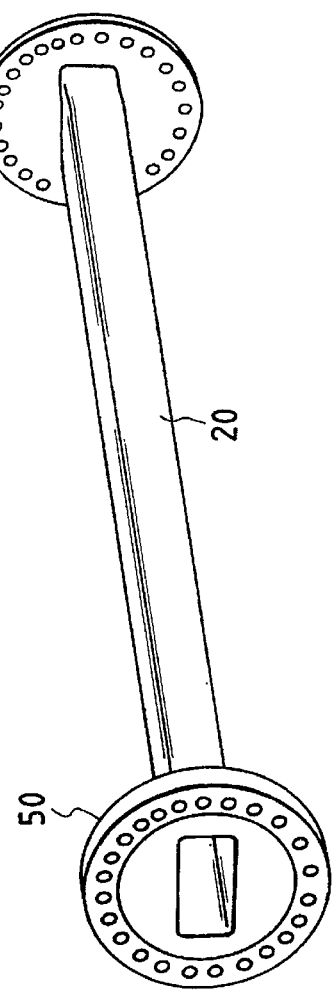
FIG. 13 is a perspective view of the vacuum chamber obtained through the process according to the present invention.

FIG. 13 is a perspective view of the vacuum chamber obtained through the process of affixing the branch pipes, flanges and the like required by welding after treating the inner surface of the vacuum chamber. When the inner surface of the vacuum chamber of the accelerator is treated according to the present invention, for example, the inner surface of the continuous vacuum chamber is cut in the axial direction, so that the contaminated and decomposed layer 21 is removed. Consequently, gas desorption due to thermal desorption and photodesorption based on synchrotron radiation in an electron storage ring is considerably reduced. In addition, the number of charged particles is restrained from decreasing in the accelerator such as an electron storage ring.

As the vacuum chamber produced in accordance with the process of treating the inner surface of the vacuum chamber and in the apparatus therefor offers high surface planing precision, it is applicable to not only a storage ring but also an accelerator, a waveguide and the like.

Figure 14:
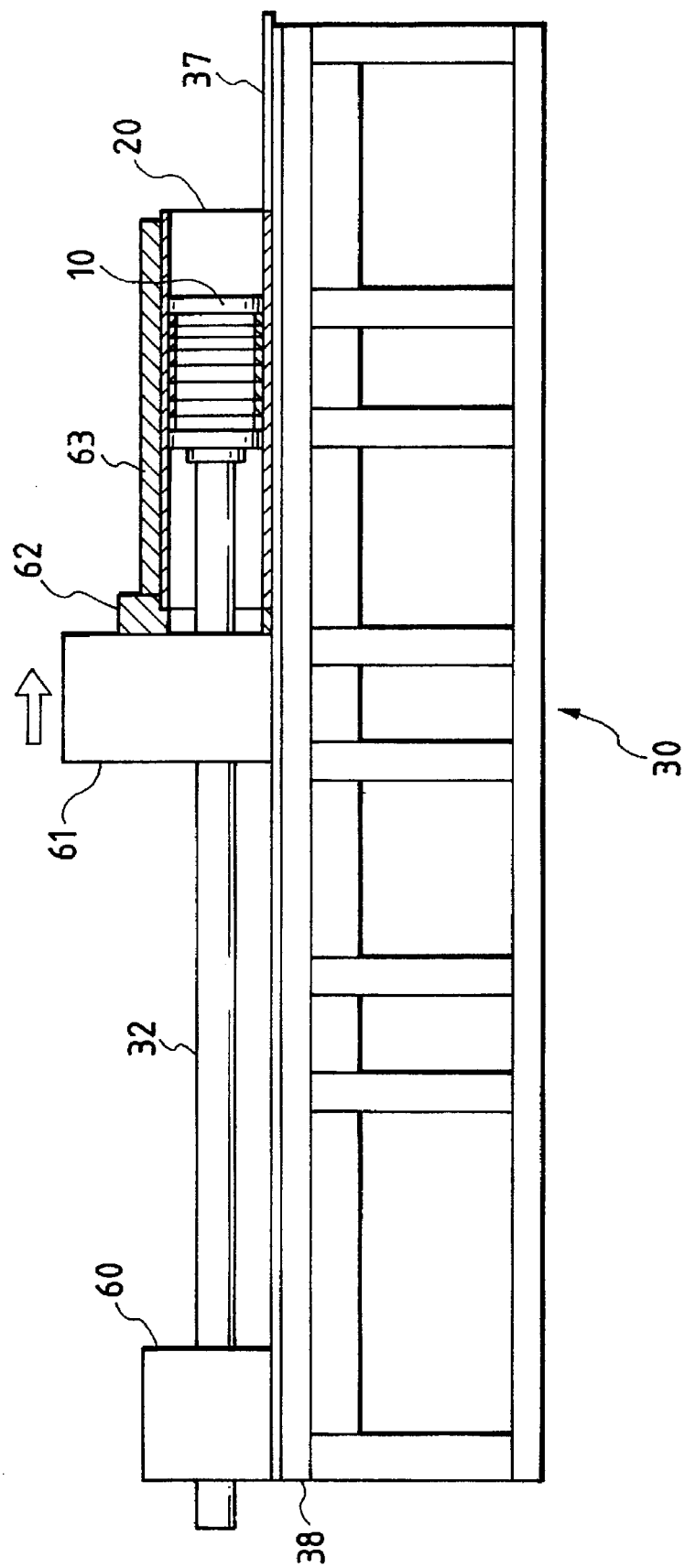
FIG. 14 is a diagram illustrating the construction of an apparatus for treating the inner surface of a vacuum chamber by moving a vacuum chamber with a broach being fixed according to the present invention.

FIG. 14 is a diagram illustrating the construction of an apparatus for treating the inner surface of a vacuum chamber as a modified embodiment of the present invention by moving a vacuum chamber with a broach being fixed unlike the case of FIG. 1. While the rod driver 34 is used to move the broach 10, the inner surface of the vacuum chamber 20 is treated in the embodiment of the invention as shown in FIG. 1. It is however possible to treat the inner surface of the vacuum chamber 20 with the broach 10 fixed according to the present invention as shown in FIG. 14.

In the modified embodiment of the invention as shown in FIG. 14, the rod 32 for supporting the broach 10 is anchored to the support 38 with a fixture. On the other hand, vacuum chamber holders 62, 63 are used to couple the vacuum chamber 20 as an object to be treated to a vacuum chamber driver 61, whereby the vacuum chamber 20 together with the vacuum chamber driver 61 is moved to the right. In this case, though the driving source of the vacuum chamber driver 61 is not shown, a drive system such as a ball screw or hydraulic drive unit, similar to what is shown in FIG. 1, for pressing the vacuum chamber from the left-hand side may be employed. A drive unit for pulling the vacuum chamber to the right may also be used.

When the vacuum chamber driver 61 thus constructed is operated, the inner surface of the vacuum chamber 20 is cut by the cutting edges formed on the outer periphery of the broach 10. At this time, the vacuum chamber 20 receives counter force accompanying the inner surface cutting and what causes the vacuum chamber 20 to pull back in the direction opposite to the arrow of FIG. 14. However, the vacuum chamber holder 62 resists against the counter force and causes the vacuum chamber 20 to move together with the vacuum chamber driver 61. Even when vertical force is applied to the direction in which the vacuum chamber 20 proceeds because of an error in the dimension of the inner diameter of the vacuum chamber, the vacuum chamber holder 63 stops the vacuum chamber 20 from deflecting in the perpendicular direction and causes the vacuum chamber 20 to move together with the vacuum chamber driver 61.

Even in the modified embodiment of FIG. 14, the contaminated and decomposed layer 21 on the inner surface of the vacuum chamber 20 can be removed as it moves in the axial direction. When the chamber is used as a vacuum chamber, gas desorption due to thermal desorption and photodesorption can considerably be restrained.

In the case of the modified embodiment of FIG. 14, the rod 32 and the broach 10 attached to the right end of the rod are not moved at the time the inner surface of the vacuum chamber 20 is treated. Consequently, the hose 42 needs not attaching and detaching when the vacuum chamber 20 as an object to be treated is replaced in a case where gas and liquid is supplied from the left-hand side of the cutting surface by means of broach 10. The gas and liquid supply system can thus be simplified in construction and readily operated.

Figure 15:
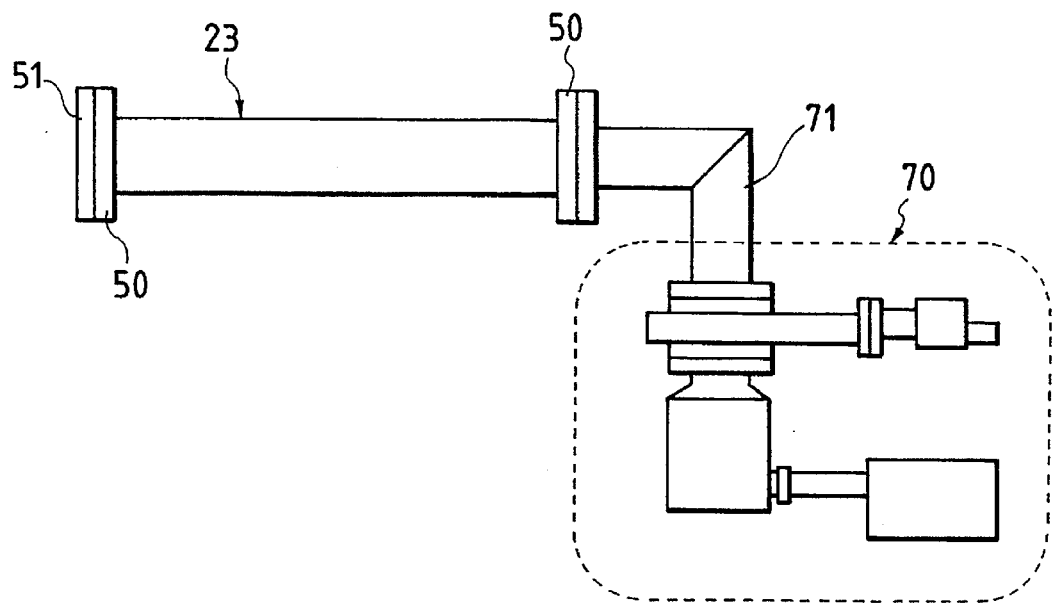
FIG. 15 is an elevational view of a vacuum vessel according to the present invention.

FIG. 15 is an elevational view of a vacuum chamber according to the present invention. As shown in FIG. 15, a flange 50 is fitted to both ends of the vacuum chamber 20 subjected to the inner surface cutting treatment by means of broach 10 and used to couple chambers together to form a vacuum vessel 23. One end of the vacuum vessel 23 is coupled to a sealing flange 51 and the other to a pumping system 70 to complete an airtight vessel. The gas contained in the vacuum vessel 23 separated by the sealing flange from the atmosphere is discharged via a pumping chamber 71 into the pumping system 70 equipped with a gate valve and a vacuum pump.

Figure 16:
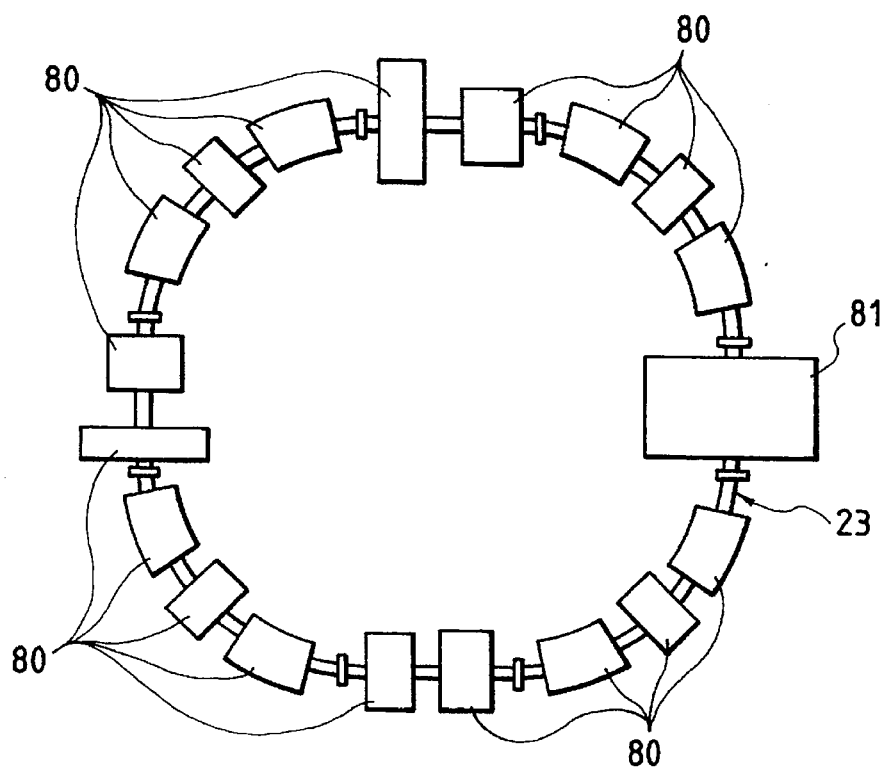
FIG. 16 is a top view of an accelerator according to the present invention.

FIG. 16 is a top view of a charged particle accelerator formed with an annular vacuum vessel and refers to an example of a synchrotron as a circular accelerator. Charged particles such as electrons and ions are supplied with energy from a RF(Radio Frequency) cavity 81 in the vacuum vessel 23 that has been evacuated before being accelerated. In order to revolve charged particles stably in the vacuum vessel, two-, four- and six-pole electromagnets 80 are arranged in such a way as to surround the vacuum vessel. As the number of gas molecules existing in the vacuum vessel decreases because of evacuation, it is likely to considerably lessen the probability that charged particles collide with gas molecules during the time they are accelerated. Consequently, the number of charged particles to be scattered and lost in the vacuum vessel is considerably reduced. Particularly when the charged particles are electrons, they will emit electromagnetic waves called radiation if their orbits are bent by the electromagnetic or magnetic field. The inner wall of a vacuum vessel is then irradiated with such electromagnetic waves, thus releasing quantities of gas due to photodesorption. The gas collides with the charged particles and causes the charged particles to become lost and short-lived. As the degree of cleanliness in the vacuum vessel of the accelerator is raised according to the present invention, the photodesorption is made reducible by a large margin, which results in prolonging the life of charged particles. Moreover, the controllability of the beam shape of a beam as a collection of charged particles is improved as their scattering is lessened.

As set forth above, the contaminated and decomposed layer formed on the inner surface of the vacuum chamber is removable for certain in the axial direction of the surface thereof when raw material is used to form the vacuum chamber according to the present invention. It is therefore possible to significantly reduce the gas desorption from the vacuum vessel due to thermal desorption and photodesorption originating from the synchrotron radiation generated in the electron storage ring.

Moreover, the chemical surface treatment of the vacuum chamber and also the facilities required therefor become unnecessary. There is also no possibility that the inner surface is ruined by the chemical surface treatment and that the compound layer as a source of gas desorption is newly formed.

Further, discharge cleaning can also be dispensed with and this prevents not only the chamber material from being sputtered during the discharge cleaning process but also the discharge gas itself from penetrating into the material.

Still further, the pre-baking is not needed, whereby any reduction in material strength can be avoided.

As a result, it is possible to obtain vacuum chambers offering the least gas desorption due to thermal desorption and photodesorption originating from the synchrotron radiation.

What is claimed is:

1. A process for treating an inner surface of a vacuum chamber comprising the steps of contacting at least one cutting edge of a broach with the inner surface, cutting off a contaminated layer on the inner surface with cutouts in an outer periphery of the broach with relative movement in an axial direction of the vacuum chamber between the broach and the vacuum chamber, and supplying to a cutting edge, during the cutting off step, at least one of an inert gas, nitrogen and a mixture of the inert gas and nitrogen.

2. A process for treating the inner surface of a vacuum chamber as claimed in claim 1, wherein the contaminated layer on the inner surface of the vacuum chamber is cut off while a solvent for contaminants contained in the contaminated layer is being supplied to the inner surface of the vacuum chamber treated by the broach.

3. A process for treating the inner surface of a vacuum chamber as claimed in claim 1, wherein the contaminated layer on the inner surface of the vacuum chamber is cut off while a solvent for contaminants contained in the contaminated layer is being supplied to the inner surface of the vacuum chamber treated by the broach.

4. A process for treating an inner surface of a vacuum chamber comprising the steps of:

cutting off a contaminated layer on the inner surface of the vacuum chamber by using a broach having a plurality of cutting edges each having cutouts in outer peripheries thereof;

moving the broach and the vacuum chamber relative to each other in an axial direction of the vacuum chamber, while supplying to the cutting edges at least one of an inert gas, nitrogen, and a mixture of the inert gas and nitrogen; and finishing the inner surface in the axial direction with finishing edges, wherein the finishing edges are an integral part of the broach, having the same external diameter as that of a final-stage cutting edge.

* * * * *